May 18, 1943. G. McCORMICK ET AL 2,319,466
CAR TRUCK SAFETY DEVICE
Filed Aug. 8, 1941 3 Sheets-Sheet 1

INVENTORS
George McCormick
Ben M. Brown
BY Booth & Booth
ATTORNEYS

Patented May 18, 1943

2,319,466

UNITED STATES PATENT OFFICE 2,319,466

CAR TRUCK SAFETY DEVICE

George McCormick, Redwood City, and Ben M. Brown, Palo Alto, Calif.

Application August 8, 1941, Serial No. 405,978

8 Claims. (Cl. 104—242)

The present invention relates to safety devices for railway car trucks, and constitutes an improvement on our prior invention forming the subject matter of United States Patent No. 2,227,733.

The general object of the present invention is the same as that of our said Patent No. 2,227,733, viz.: to prevent excessive lateral displacement of the truck in the event of derailment, by providing a member on the truck with a depending flange positioned to engage the side of the rail when the wheel drops off the rail.

The specific objects of this invention are to provide a safety flange or derailment guard especially adapted for trucks which have integral or cast side frames, and to provide derailment guards of adequate size and strength positioned close to the wheels, which add little to the weight and cost of the truck and which do not interfere with the normal truck parts and accessories.

Other objects and advantages of the invention will become apparent from the following description, which should be read with the understanding that the form, construction and arrangement of the several parts may be changed, within the limits of the claims hereto appended, without departing from the spirit of the invention. It is to be understood that the invention is applicable to trucks for various types of cars and locomotives, as will be seen from the following description.

The accompanying drawings consist of the following views.

Figure 1:
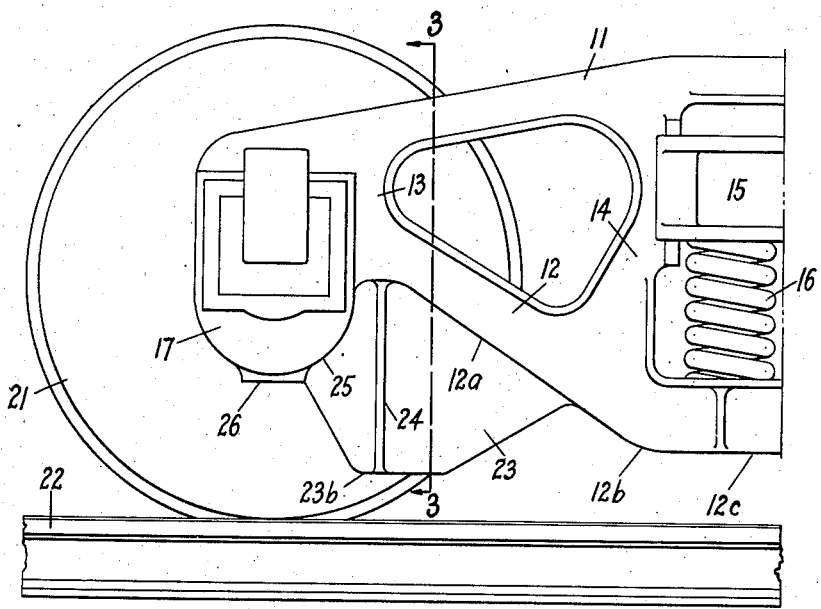
Fig. 1 is a side elevation of the end portion of a truck having a cast side frame and a journal box integral with said frame, showing our safety flange formed integral with the frame and the box.

Truck side frames of the integral or cast steel type are customarily made with an upper chord or compression member 11, and a lower chord or tension member 12. These two members join at the ends of the frame, one end being shown at 13 in Figs. 1, 2 and 5. From said end juncture 13, the lower member 12 is inclined downwardly, as shown at 12a to a point 12b from which it extends horizontally as at 12c through the central portion of the truck. The upper and lower members are connected by vertical bolster columns, one of which is shown at 14, and the bolster 15 and springs 16 operate in the space between said columns 14.

It is usual, in side frames of this type, to make the upper and lower members of channel cross section with their open sides facing each other. Thus the lower member 12 consists of an inner vertical flange or wall 12d, Fig. 3, an outer vertical flange or wall 12e, and a horizontal connecting web 12f.

The journal box 17, in one type of cast side frame, is cast integrally with the end portion 13 of the frame, as shown in Fig. 1. In another type of cast frame, shown in Fig. 2, the journal box 17 is removably held in a rectangular jaw 13a formed as an extension of the frame end 13. In a third type of cast frame, shown in Fig. 5, the journal box 17 is secured to the frame end 13 by bolts 18 which pass through lugs 19 at the top and bottom of the box.

The journal box 17 contains the bearing for one end of the axle 20, upon which the wheels are mounted. One of said wheels is shown at 21, and the rail upon which it runs is shown at 22. In the trucks herein shown, the side frames and journals are outside the wheels, but in other types, not shown, having similar side frames, the frames and journals are inside the wheels.

Figure 2:
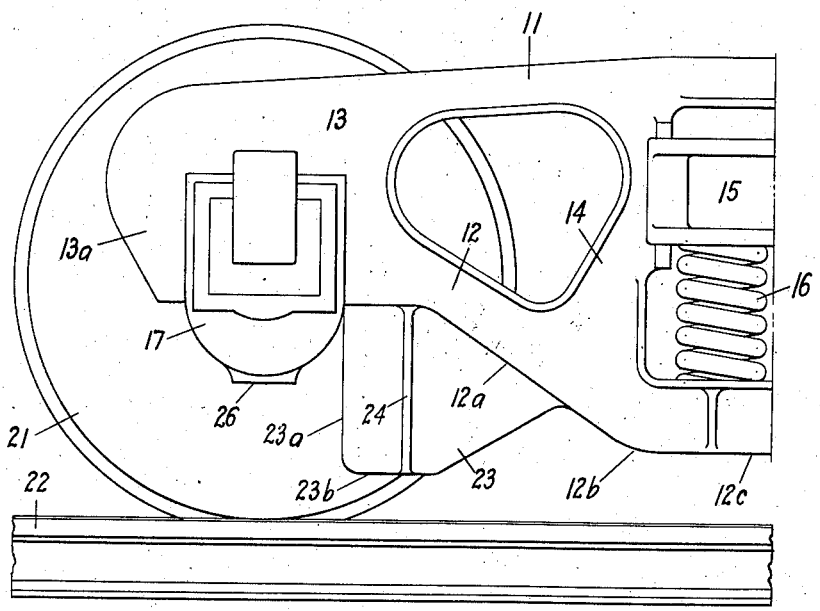
Fig. 2 is a similar side elevation of a truck having a cast side frame and a separate removable journal box, showing our safety flange formed integral with the frame adjacent to the removable box.
Figure 3:
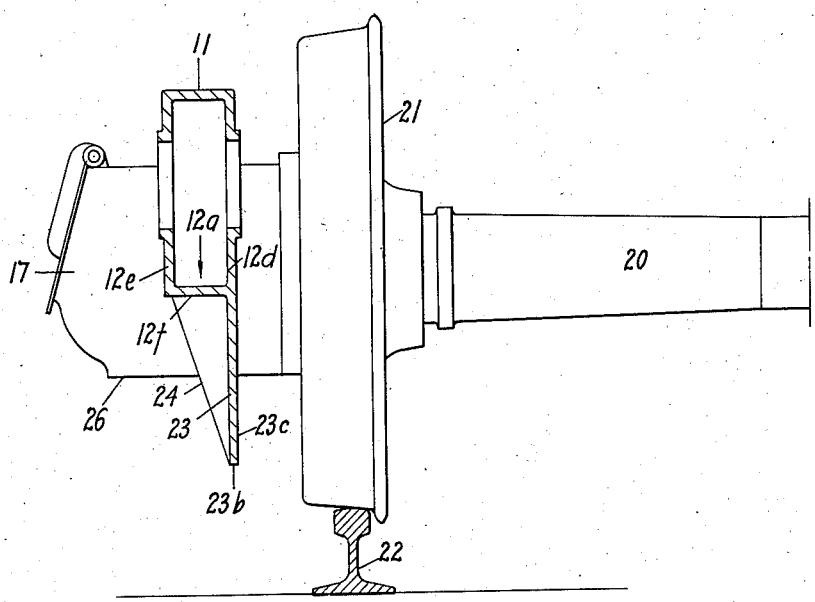
Fig. 3 is a section taken on the line 3—3 of Fig. 1 showing the relative positions of the wheel, rail, and safety flange when the wheel is on the rail.

Our present invention contemplates a bracket in the form of a vertical flange 23, Figs. 1, 2 and 3, extending downwardly from the inclined portion 12a of the lower frame member 12 and provided with a triangular, stiffening and bracing web or reinforcement 24 on its outer side. In frames in which the lower member 12 is of channel cross section, we prefer to form the flange 23 as a downward extension of the inner frame flange or wall 12d, as shown in Fig. 3, and the base of the triangular web 24 joins the bottom web 12f of the frame.

In the type of truck shown in Figs. 1 and 2, we prefer to cast the flange bracket 23 integrally with the side frame, although it can be formed separately and attached by welding. Where the journal box 17 is integral with the side frame, as shown in Fig. 1, the flange 23 extends partly beneath said journal box, and is either integral therewith or welded thereto on the line 25. The flange preferably does not extend beneath the jack pad 26 on the bottom of the journal box, so that it does not interfere with the use of a jack in lifting the truck.

In the jaw type of truck shown in Fig. 2, the forward edge 23a of the bracket is in line with the rear side of the jaw, so that the journal box can be lowered out of the frame.

Figure 4:
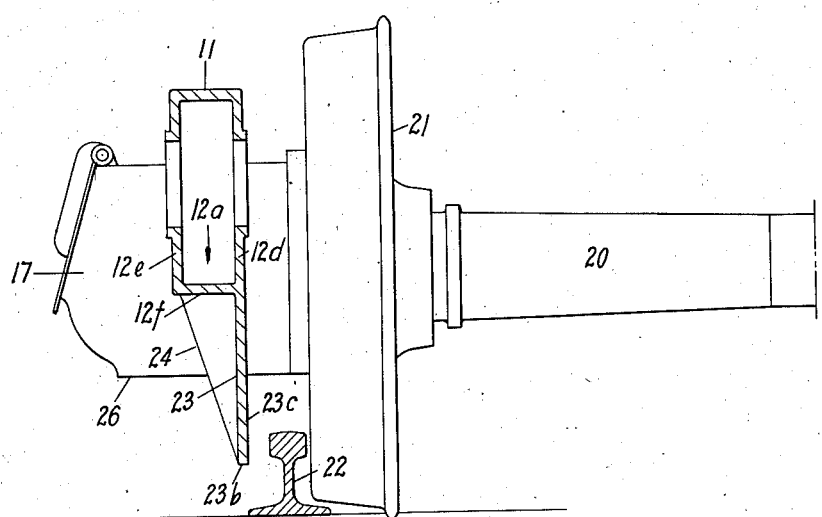
Fig. 4 is a section similar to Fig. 3 showing the relative positions when the wheel is de-railed.

The bottom edge 23b of the vertical flange 23 is positioned above the top of the rail a sufficient distance to enable it to clear all track accessories when the wheel is on the rail, but said distance is less than the height of the rail above the ties, so that, when the wheel is derailed and drops down on to the ties, as shown in Fig. 4, the inner surface 23c of said flange will engage the side of the rail and will prevent excessive lateral displacement of the truck. The wheels will run along on the roadbed, with the rail between said wheels and the flange 23.

Figure 5:
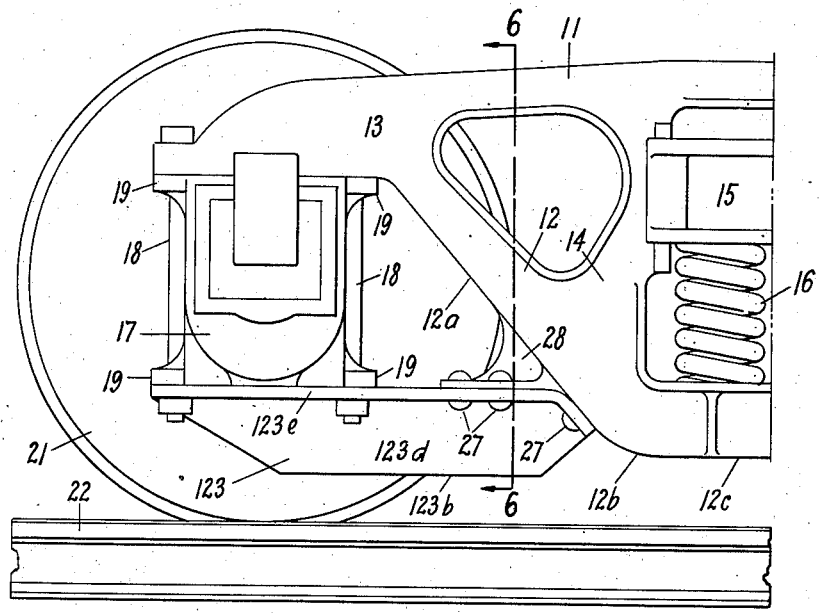
Fig. 5 is a side elevation similar to Fig. 1 of a truck having a cast side frame and a journal box bolted thereto, showing our safety flange attached to both the frame and the box.
Figure 6:
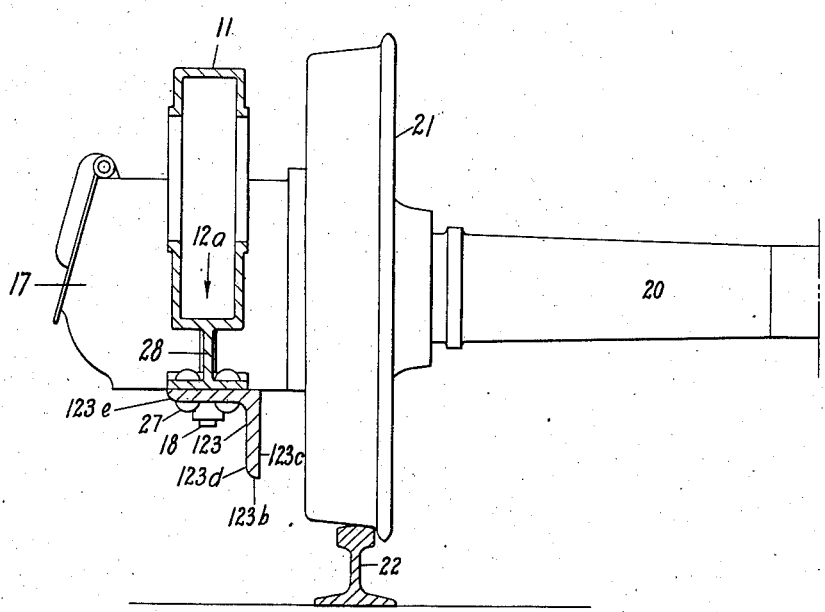
Fig. 6 is a section taken on the line 6—6 of Fig. 5.

In the type of truck shown in Figs. 5 and 6, where the journal box is bolted to the side frame, we prefer to make our safety flange or bracket as a separate angle member 123, having a vertical flange 123d and a horizontal flange 123e. One end of said member 123 is secured, by riveting, bolting, or welding (rivets are shown in the drawings at 27), to the inclined portion 12a of the lower member 12 of the side frame. A bracket or gusset 28 is preferably welded to or cast integrally with the inclined frame portion 12a to strengthen the connection of the flange member 123 therewith. The other end of said flange member is secured to the bottom of the journal box 17, preferably by the bolts 18 which secure the box to the frame, said bolts extending through the horizontal flange 123e of the member 123.

The flange member 123 is proportioned and positioned so that its bottom edge 123b is normally sufficiently higher than the rail to clear all track accessories, but yet is low enough for its inner surface 123c to engage the side of the rail when the wheel runs on the ties, as shown in Fig. 6. The flange member 123 is therefore similar in position and function to the flange 23 of Figs. 1 and 2. The horizontal flange 123e of the member 123 lies beneath the jack pad 26 of the journal box, but does not interfere with its use, since the head of a jack can be placed beneath said horizontal flange.

It will readily be seen that our improved safety flange bracket is located in a place where it is most effective, and yet presents no interference to the normal operation of the truck. By attaching the bracket to, or making it integral with, the inclined portion 12a of the lower member of the side frame, and extending it to the near side of the journal box as in Fig. 2 or attaching it to the bottom of the box as in Figs. 1 and 5, said bracket is positioned close to the point of contact between wheel and rail, and is therefore more effective as a guard than if it were between the wheels nearer the center of the truck. Moreover, the shape of the truck frame at this point permits the safety bracket to be made for maximum strength, and also enables it to act as a reinforcement for the side frame, and, with the integral and bolted types of journal box shown in Figs. 1 and 5, as a reinforcement for the box itself.

It will also be seen that our improved safety bracket does not alter the usual design of the side frame, which is a feature of value in an improvement in an article of manufacture as fully standardized as a railway truck. Our bracket may even be added to existing trucks, by welding it to the side frame as previously described.

It is understood, of course, that our safety bracket is to be applied at both ends of each side frame of a truck, so that each corner of the truck is protected against excessive lateral displacement in the event of derailment. In trucks having the side frames inside the wheels, our invention contemplates reversing the safety brackets so that the outer surfaces of their flanges would engage the inside of the rail, i. e. the rail would run between the back or inside of the wheel and the front or outer surface of the flange in the event of derailment. Since this latter construction is a mere obvious reversal in position of the same parts as shown and described herein, it has not been separately illustrated.

We claim:

1. In a railway car truck having an integrally formed frame at each side, said frames having jaws near their ends, journal boxes removably seated in said jaws, axles journaled in said boxes, and rail running wheels on said axles, the lower portion of each frame being inclined downwardly from said jaws toward the longitudinal center of the truck to form approximately inverted V shaped spaces between said inclined frame portions and said boxes, brackets formed integrally with said frames and extending downwardly therefrom in said spaces between said inclined portions and said jaws, each of said brackets having a side face positioned to engage the side of the rail when the adjacent wheel is derailed, and a lateral reinforcing flange integral with said inclined frame portion and said bracket positioned on the side of said bracket opposite its rail engaging face.

2. In a railway car truck having axles and rail running wheels thereon, journal boxes for said axles, side frames connecting the journal boxes on each side of the truck, each frame being an integrally formed structure having upper and lower longitudinal members, the ends of the lower member being joined to the ends of the upper member adjacent the upper portions of the journal boxes and sloping downwardly therefrom to form approximately inverted V shaped spaces between said sloping frame portions and said boxes, brackets positioned in said spaces, each bracket being fixed to one of the sloping frame portions and extending therefrom to the lower portion of the adjacent box, each bracket extending downwardly and having a side face positioned to engage the side of the rail when the adjacent wheel is derailed.

3. In a railway car truck having axles and rail running wheels thereon, journal boxes for said axles, side frames connecting the journal boxes on each side of the truck, each frame having a longitudinal member, each end portion of said member sloping downwardly from the upper portion of the adjacent journal box to form an approximately inverted V-shaped space between said sloping frame portion and said box, a bracket positioned in said space fixed to said sloping frame member and extending therefrom to the lower portion of the adjacent box, a substantially vertical flange extending downwardly from said bracket, said flange having a side face laterally spaced from the adjacent wheel by a distance greater than the width of the rail, and the bottom of said flange being spaced above the top of the rail by a distance less than the height of said rail.

4. In a railway car truck having axles and rail running wheels thereon, journal boxes for said axles, side frames connecting the journal boxes on each side of the truck, each frame having a longitudinal member, each end portion of said member sloping downwardly from the upper portion of the adjacent journal box to form an approximately inverted V-shaped space between said sloping frame portion and said box, a bracket positioned in said space, said bracket being formed integrally with said sloping frame member and extending therefrom to the lower portion of the adjacent box, a longitudinal depending flange formed on each bracket, said flange having a side face positioned to engage the side of the rail when the adjacent wheel is derailed, and a transverse reinforcing flange extending downwardly from said frame member to laterally stiffen said longitudinal flange.

5. In a railway car truck having side frames, axles, and rail running wheels thereon, a journal box fixedly connected with each end portion of each frame, said frame having a lower member sloping downwardly from the upper portion of said journal box to form an approximately inverted V shaped space between said sloping frame member and said box, a bracket positioned in said space and fixedly connected with said sloping frame member and with the lower portion of said box, and a flange depending from said bracket, said flange having a side face positioned to engage the side of the rail when the adjacent wheel is derailed.

6. A railway truck side frame comprising integrally formed upper and lower members joined at their ends and connected intermediate their ends by bolster columns, said lower member having vertical inner and outer side walls connected by a transverse web, and vertical flanges extending downwardly from said lower member, said flanges being substantially in alignment with said inner wall and extending longitudinally from the junctions of said upper and lower members to said bolster columns.

7. A railway truck side frame comprising integrally formed upper and lower members joined at their ends and connected intermediate their ends by bolster columns, said lower member being U shaped in cross section and having vertical inner and outer side walls connected by a transverse web, vertical flanges extending downwardly from said lower member, said flanges being substantially in alignment with said inner wall and extending longitudinally from the junctions of said upper and lower members to said bolster column, and a lateral reinforcement extending downwardly from said web on the outer side of each vertical flange.

8. A railway truck side frame comprising integrally formed upper and lower members joined at their ends and connected intermediate their ends by bolster columns, said lower member having vertical inner and outer side walls connected by a transverse web, and vertical flanges extending downwardly from said lower member, said vertical flanges being integral downward continuations of said inner wall, and extending longitudinally from the junctions of said upper and lower members to said bolster columns.

GEORGE McCORMICK.
BEN M. BROWN.